April 8, 1952 C. SHEAFFER 2,591,732

RADIO APPARATUS

Filed March 5, 1945 3 Sheets-Sheet 1

*INVENTOR.*
CHARLES SHEAFFER
*BY* William D. Hall
ATTORNEY

INVENTOR.
CHARLES SHEAFFER
BY William D. Hall
ATTORNEY

INVENTOR.
CHARLES SHEAFFER
BY William D. Hall
ATTORNEY

Patented Apr. 8, 1952 2,591,732

UNITED STATES PATENT OFFICE 2,591,732

RADIO APPARATUS

Charles Sheaffer, Long Branch, N. J.

Application March 5, 1945, Serial No. 581,008

5 Claims. (Cl. 250—6)

(Granted under the act of March 3, 1883, as amended April 30, 1928; 370 O. G. 757)

The invention described herein may be manufactured and used by or for the Government for governmental purposes, without the payment to me of any royalty thereon.

This invention relates to radio systems and, more particularly, to improvements in phase-modulated pulse transmitting and receiving systems.

An object of this invention is to provide a system of transmission and reception in which the character of the transmitted wave is adaptable for use with high frequency type magnetron oscillators as sources of radio energy, altho not restricted to such use.

Another object of this invention is to provide a transmitted wave in which the total energy content is not a function of the modulating potential.

Another object of this invention is to provide a system of transmission and reception which offers advantages in the elimination of unwanted noise signals.

In accordance with my invention I provide a transmitting system which transmits alternating sequences of pulses, at a rate above audibility, each alternate sequence of which is under control of a phase modulating system which causes the phase, or time position, of one alternate sequence to be displaced in the opposite direction from the other under influence of the applied modulating signal. I also provide a receiving system which amplifies and detects the transmitted signal and which contains means for discriminating the harmonic content of the transmitted wave envelope and utilizes the resultant derived harmonics for interpreting the intelligence contained therein.

Further details of my invention, together with other and further objects thereof will be apparent from the following specification and drawings which illustrate a preferred embodiment of my invention, and in which.

Figure 1:
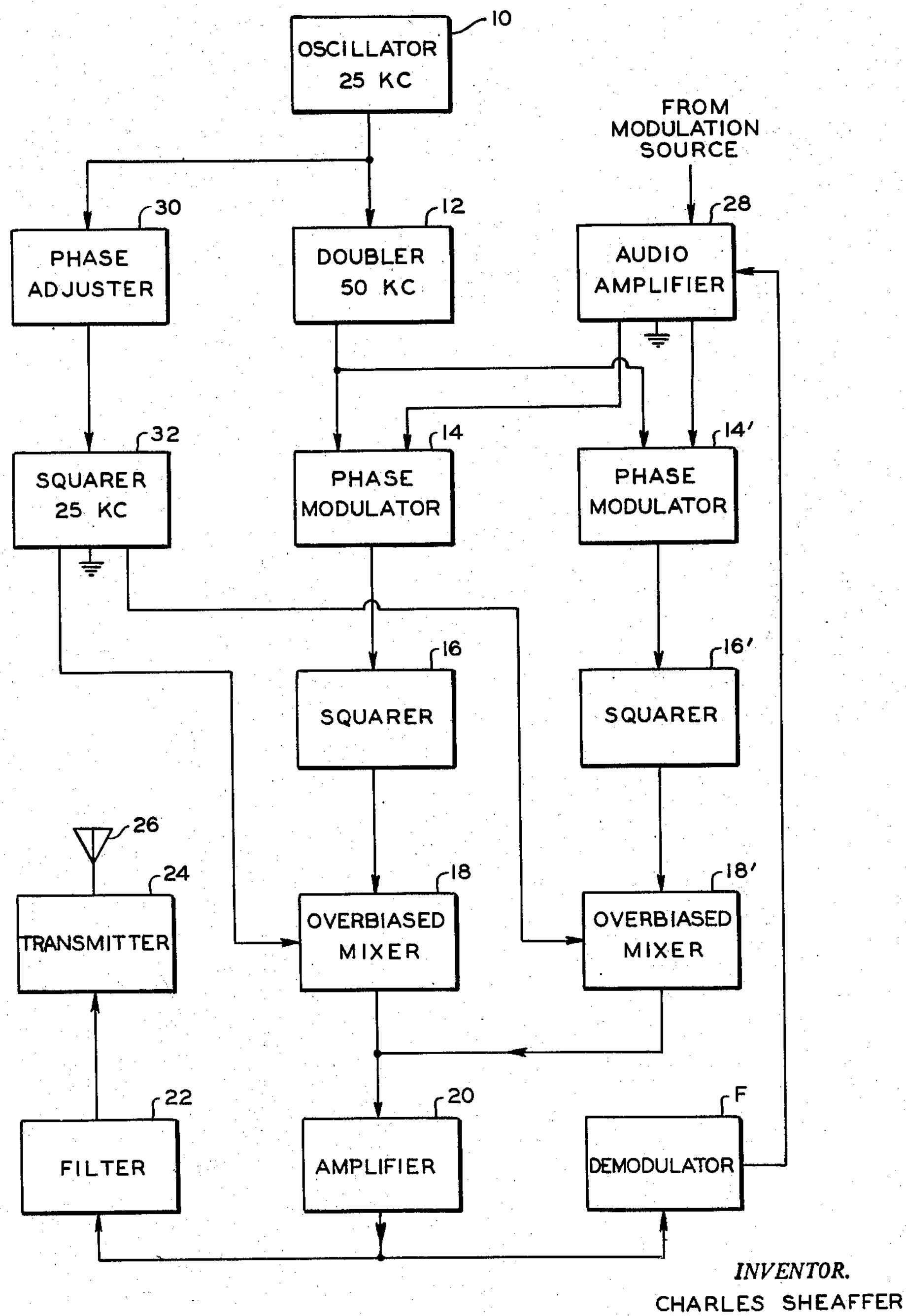
Figure 1 is a block diagram of the transmitter portion of the invention.

Referring now to Fig. 1, an oscillator 10 generates a sine wave subcarrier frequency which is substantially higher than the highest modulation signal frequency which will be used. Thus, in the present example where the full audio-frequency range is to be used, the frequency of oscillator 10 may be 25 kilocycles. This frequency is changed to 50 kc. by a frequency doubler 12, the output of which is applied in parallel to two like channels including, respectively, phase modulators 14 and 14', wave squarers 16 and 16', and overbiased mixers 18 and 18', the latter being normally biased considerably below cutoff so that there is normally no signal output therefrom. The 25 kc. wave from oscillator 10 is also applied, through a phase adjuster 30, to a squaring circuit 32 having a push-pull output, one phase of said output being applied to mixer 18, and the opposite phase of said output being applied to mixer 18'.

The currents from mixers 18 and 18' are combined and applied to the input circuit of an amplifier 20, and then, preferably through a filter 22, to an ultra-high or super-high frequency transmitter 24, the output of which is radiated by an antenna 26.

Phase modulators 14 and 14' are adapted to be controlled in opposite sense by means of the push-pull output of an audio amplifier 28 to which the modulation signal is applied. Hence, a given modulation potential will operate to advance the phase of the sine-wave output of one of the modulators a given amount, and to retard the phase of the output of the other modulator a like amount.

Figure 2:
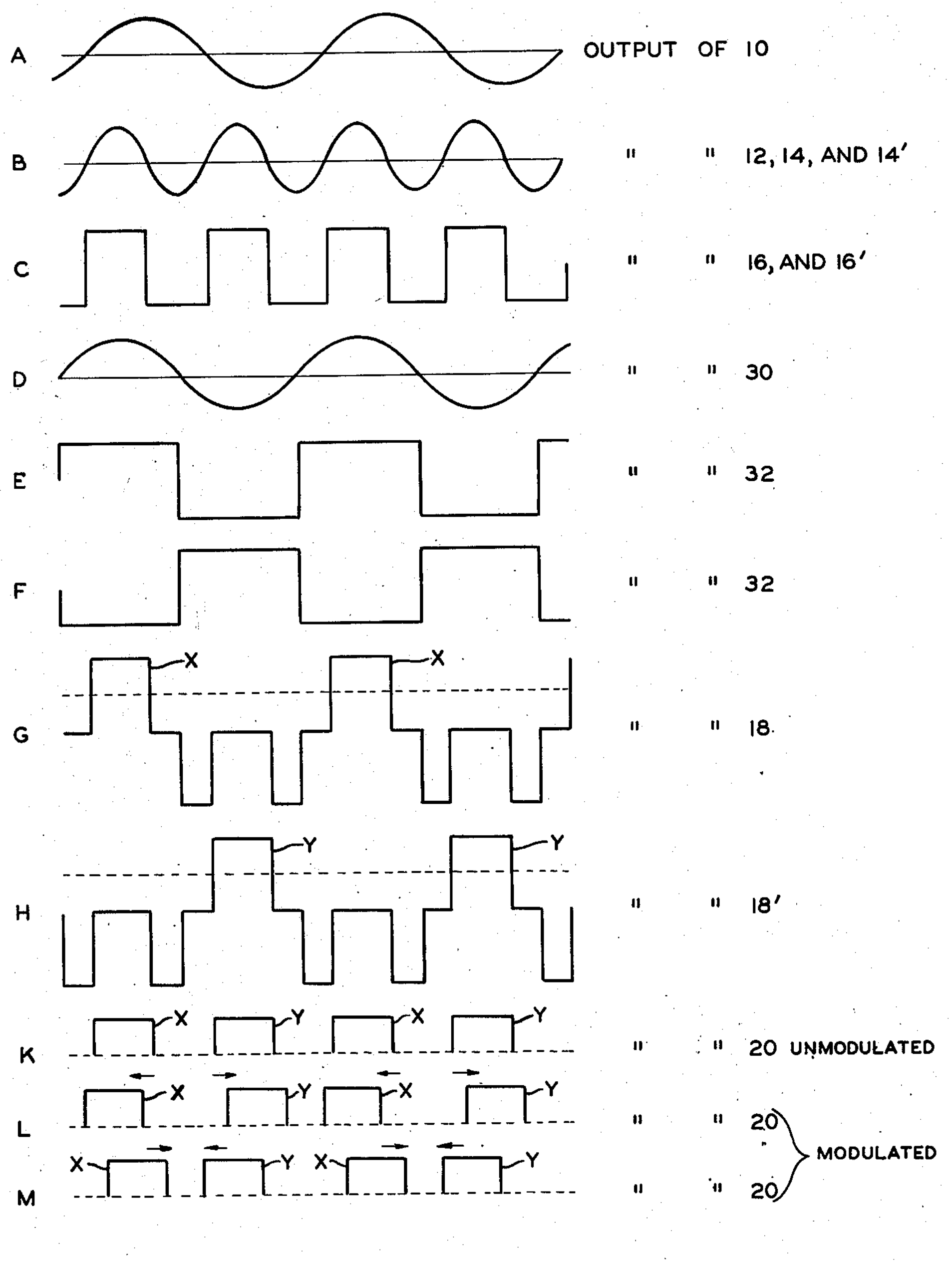
Figure 2 is a series of wave diagrams illustrating the operation of Fig. 1.

The operation of the system as thus far described will now be explained with reference to Fig. 2, which shows the wave forms of the potentials at various points of the system, as well as their relative phase relation. Assuming that no modulation signal is applied to the phase modulators, wave A represents the 25 kc. output of subcarrier oscillator 10, and wave B the 50 kc. output of doubler 12, as well as the outputs of phase modulators 14 and 14', both of which have the same phase relation when no modulation signal is applied. Wave C shows the squared 50 kc. outputs of squarers 16 and 16' which are applied to the overbiased mixers 18 and 18'.

Wave D is the same as wave A, its phase being slightly shifted with respect to wave A by the phase adjuster 30. This wave is squared by squarer 32 having a push-pull output circuit which yields two square waves 180° out of phase with each other, as shown at E and F.

Waves C and E combine in the input of mixer 18 to form a wave such as shown at G. Waves C and F combine at the input of mixer 18' to form a wave such as shown at H. Since mixers 18 and 18' are negatively biased to such extent that they only pass potentials which are above the dotted lines in curves G and H, only the portions X and Y, which are above said dotted lines, will appear in the outputs of said mixers. Thus, the output of each mixer contains a group of pulses having a repetition rate equal to the frequency of oscillator 10, the pulses of one group alternating with the pulses of the other group. Said outputs are now combined and amplified by amplifier 20 which yields a resultant wave K wherein waves X and Y alternate with each other, preferably at equal intervals.

It will be seen that the intervals between the components X and Y of wave K are equal when no modulation signal is applied. When a given modulating potential of one polarity is applied to audio amplifier 28, the push-pull output thereof will cause phase modulator 14 to retard the phase of the 50 kc. sine wave applied thereto, and cause phase modulator 14' to advance said phase an equal amount. This will result in a wave such as shown at L, wherein pulses X of each pair will be retarded and pulses Y will be advanced an equal amount. When a modulating signal of opposite polarity is impressed upon the phase modulators, the pulses in each pair will move toward each other, as shown at M.

Thus, it will be seen that a subcarrier is generated which consists of successive pairs of phase-displaced pulses of like duration and having a repetition rate higher than the highest frequency of the modulating signal. The phase relation of the two pulses of each pair is fixed when no modulating signal is applied. A modulating signal operates to change the relative phase relation of said two pulses symmetrically about the mean value, the extent of said change depending upon the magnitude of the modulating signal, and the direction of said change depending upon the polarity of said modulating signal.

The output of amplifier 20 may be passed through a filter 22 to suppress those higher harmonics of the waves produced by the squarers, which are not necessarily needed for the transmission of the intelligence. The resultant pulses are now impressed upon the modulating circuit of a normally blocked radio transmitter 24 which is forced into oscillation by each pulse to generate successive wave trains each having the duration of said pulses. These wave trains are then radiated through a suitable antenna 26.

Phase modulators 14 and 14' can be of any well known type, preferably one that can shift the phase as much as 90°. Examples of suitable types are shown in Brown Patent No. 2,347,458 and Pieracci Patent No. 2,301,907. However, modulators which can shift the phase to such great extent are likely to be non-linear. Another type nonlinearity that may be caused in the phase modulators is due to the fact that any change in phase is accompanied by a change in frequency which causes the width of the resultant pulses to vary as a function of the rate at which the phase is changing. The latter effect is most pronounced in the high frequency portion of the modulation spectrum where the normal degree of phase change transmitted is relatively small.

Figure 3:
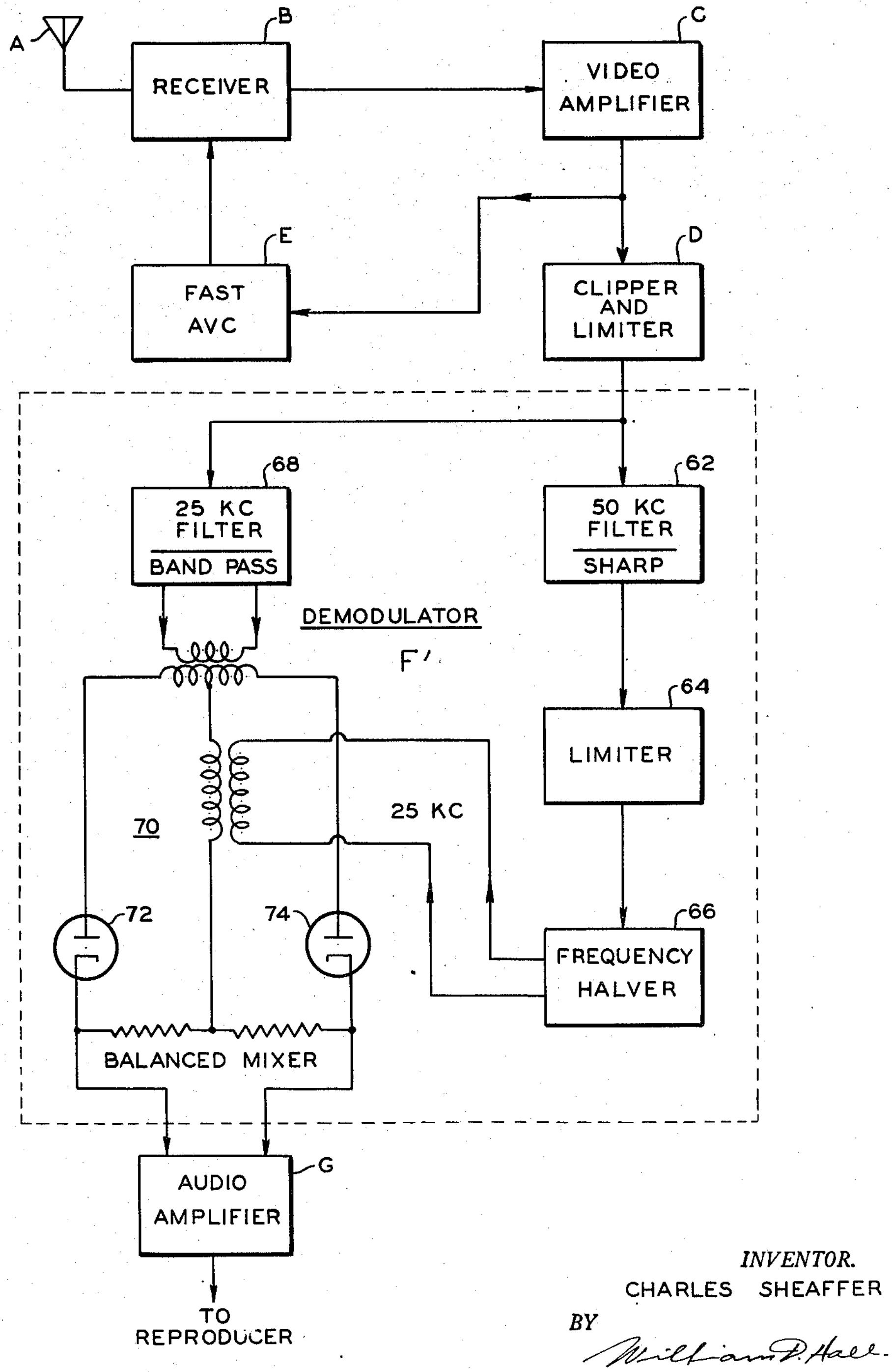
Figure 3 is a block diagram of the receiver portion of the invention.

Degenerative action is used to correct both types of distortion. For this purpose, the output of amplifier 20 is applied to a demodulator circuit F to reconvert the phase modulated pulse output to the original modulation signal which is, in turn, applied in degenerative phase to the audio amplifier 28, in a manner well known in the art. This degenerative component will act to reduce the distortion components above discussed. Demodulator F operates exactly as does the demodulator F' used in the receiver system hereinafter described in connection with Fig. 3.

The receiver system comprises an antenna A which feeds into a conventional receiver B, preferably of the superheterodyne type. The usual second detector of the receiver will reconvert the received pulse-modulated wave trains to pulses substantially such as shown by waves K, L, and M in Fig. 2. These will, in turn, be amplified by video amplifier C and applied to a combination clipper-limiter circuit D. This limiter is an amplifier tube circuit with the grid biased somewhat below cutoff so that only signals above a predetermined potential will cause a flow of plate current. A relatively low plate voltage is used so that the tube will saturate quickly and provide an output of substantially uniform amplitude.

The output of circuit D is applied to a demodulator circuit F', shown in the dotted enclosure, which reconverts the modulated pulse output to the original audio frequency modulation signal, which is, in turn, amplified by audio amplifier G and applied to a reproducer or other type of translating means.

Demodulator F' comprises two channels fed in parallel by the pulse output of limiter D. One channel includes a sharply-tuned 50 kc. filter 62 which passes only the 50 kc. component of the received pulses. Because of the relatively high Q of filter 62, its output is a 50 kc. sine wave of substantially constant phase. Its amplitude, however, is maximum when the pulses are unmodulated, as at K in Fig. 2, and decreases when said pulses are modulated as at L and M in Fig. 2, the amount of decrease depending upon the extent of modulation. To remove said amplitude variations the sine wave output of filter 62 is passed through a limiter 64 and then through a frequency halver 66 which yields a 25 kc. wave. The output circuit of frequency divider 66 is a sharply-tuned resonant 25 kc. circuit, so that its output is now a 25 kc. sine wave which is substantially constant in phase and amplitude.

The second channel of demodulator F' is a band-pass filter which passes the first subharmonic component of the received modulated pulses, which is 25 kc., as well as the side-bands produced by the phase modulations of said pulses. Since the repetition rate of said pulses is 50 kc., the 25 kc. component is zero when no modulation is present and when said pulses are equally spaced, as at K in Fig. 2. Hence, the output of filter 68 normally is zero. However, when said pulses are phase modulated, as at L and M in Fig. 2, the received 50 kc. pulses contain a 25 kc. subharmonic which varies in amplitude with the amplitude of the modulation signal, and which changes 180° in phase with a change in polarity of said modulation signal. This varying 25 kc. sine wave component appears in the output of filter 68.

Thus two 25 kc. components are derived from circuits 66 and 68, the one from divider 66 being a sine wave of constant amplitude and phase which corresponds to the carrier component of an amplitude modulated signal, and the one from filter 68 being a sine wave which varies in amplitude with variation in amplitude of the modulated signal and shifts 180° in phase with change in polarity of the modulated signal, and therefore corresponds to the side-band component of such modulated signal.

The two components are now mixed in a conventional, balanced mixer 70 including two rectifiers 72 and 74. The "carrier" component derived from circuit 66 is applied in like phase to both rectifiers, while the "side-band" component of filter 68 is applied in opposite phase, i. e., in push-pull to said rectifiers. The resultant signal across the series-connected load resistors of the mixer is therefore the same as the original audio frequency modulation signal applied to the modulation circuit of the transmitter.

A portion of the outputs of video amplifier C is also applied to an AVC circuit E the output of which controls the amplification of one or more stages of the receiver, preferably the intermediate frequency stages thereof. AVC circuit E has a relatively small time constant load circuit so that it functions as a high speed filter which can respond to rapid amplitude changes of the order of about 10,000 cycles per second. Thus the AVC circuit is fast enough to follow amplitude changes due to noise currents, but will not respond to pulses which have an order of duration which is considerably smaller than the time constant of the AVC circuit, which is the case with the desired signal pulses. This circuit will, therefore, have a highly degenerative action for noise signals without affecting the desired pulses, thus enabling the receiver to provide pulses of the proper amplitude to operate limiter circuit D.

There has been described a novel radio system in which a subcarrier of successive pairs of pulses is generated. Said pulses have constant repetition rate and duration, and are normally fixed in phase. A modulation signal serves to phase displace the pulses in each pair toward or away from each other, the amount of said displacement depending on the magnitude of the modulating signal and the direction of said displacement depending upon the polarity of said modulation signal. The resultant phase modulated pulses control a normally blocked radio transmitter which transmits pulse-modulated wave trains. These wave trains are received and reconverted to the modulated pulses, which are in turn demodulated to convert them into the original modulating wave. A fast acting AVC circuit is also incorporated into the receiver system to reduce the response to noise signals.

While there has been described what is at present considered a preferred embodiment of the invention, it will be obvious to those skilled in the art that various changes and modifications may be made therein without departing from the invention, and it is aimed in the appended claims to cover all such changes and modifications as fall within the true spirit and scope of the invention.

What is claimed is:

1. A phase-modulated pulse generating system comprising means for generating a modulating signal, means to generate two groups of discrete pulses, each group having a repetition frequency which is substantially higher than the highest frequency of said signal and the pulses of one group alternating at equal intervals with pulses of the other group, means controlled by said modulating signal to shift the phase of the respective groups in opposite directions and equal extents, the extent of said phase shift being proportional to the magnitude of the modulating signal and the respective directions of said phase shift being dependent upon the polarity of said modulating signal, and means to impress said pulses upon a common circuit thereby to combine said pulse groups to form a resultant pulse wave having twice said repetition frequency.

2. A phase-modulated pulse generating system comprising means for generating a modulating signal, means to generate two groups of discrete pulses, each group having a repetition frequency which is substantially higher than the highest frequency of said signal and the pulses of one group alternating at equal intervals with pulses of the other group, modulating means controlled by said modulating signal to shift the phase of the respective groups in opposite directions and equal extents, the extent of said phase shift being proportional to the magnitude of the modulating signal and the respective directions of said phase shift being dependent upon the polarity of said modulating signal, means to impress said pulses upon a common circuit thereby to combine said pulse groups to form a resultant pulse wave having twice said repetition frequency, and means for reducing undesired variations in the width of said pulses, said last means comprising a demodulator for deriving the modulating signal from said resultant pulse wave, said demodulator having its input connected to said common circuit, and means for impressing the output of said demodulator on said modulating means.

3. The apparatus defined in claim 2 wherein said demodulator comprises a pair of filters fed in parallel by said resultant pulse wave, one filter being turned to the repetition frequency of said resultant pulse wave, the other filter being broadly tuned to the first subharmonic of the repetition frequency of the said resultant pulse wave, means to limit the amplitude and halve the frequency of the output of said one filter, and a balanced mixer for combining the outputs of said last-named means and said other filter.

4. A transmitter for transmitting phase modulated pulses as envelope modulation comprising means for generating two separate sine wave voltages of the same frequency, means for phase modulating said sine wave voltages in opposite directions with respect to each other in response to signal voltages, said means comprising a pair of signal controlled phase modulators for respectively modulating said sine wave voltages and means for applying a signal in opposite phase to said modulators, means for deriving from one of said phase modulated voltages a first sequence of similarly modulated pulses, means for deriving from the other of said phase modulated voltages a second sequence of similarly modulated pulses separated in time from the pulses of the first sequence, whereby the timing of the pulses of the first and second sequence approach each other in one direction or the other in response to signal voltages, and means for impressing said first and second sequence pulses upon a common circuit for deriving a third sequence of pulses.

5. The apparatus defined in claim 4 including a demodulator for deriving signal voltages from the third sequence of pulses having its input connected to said common circuit and its output connected to said means for phase modulating the said sine wave voltage, to thereby reduce undesired modulations of the width of the pulses of the third sequence.

CHARLES SHEAFFER.

REFERENCES CITED

The following references are of record in the file of this patent:

UNITED STATES PATENTS

| Number | Name | Date |
|---|---|---|
| 2,212,568 | Kramar et al. | Aug. 27, 1940 |
| 2,256,336 | Beatty | Sept. 16, 1941 |
| 2,266,401 | Reeves | Dec. 16, 1941 |
| 2,311,796 | Wrathall | Feb. 23, 1943 |
| 2,325,366 | Brown | July 27, 1943 |
| 2,374,746 | Hansell | May 1, 1945 |
| 2,379,899 | Hansell | July 10, 1945 |
| 2,379,900 | Hansell | July 10, 1945 |
| 2,406,019 | Labin | Aug. 20, 1946 |